United States Patent [19]

Koss

[11] 4,147,578
[45] Apr. 3, 1979

[54] METHOD OF MAKING ACOUSTICAL LAMINATE

[75] Inventor: Muriel L. Koss, Arlington, Calif.

[73] Assignee: Rohr Industries, Incorporated, Chula Vista, Calif.

[21] Appl. No.: 856,261

[22] Filed: Dec. 1, 1977

Related U.S. Application Data

[62] Division of Ser. No. 672,353, Mar. 31, 1976, Pat. No. 4,091,160.

[51] Int. Cl.$^2$ .............................................. E04B 1/74
[52] U.S. Cl. ...................................... 156/245; 181/290; 428/116
[58] Field of Search ............... 156/245, 288, 228, 286; 273/DIG. 3, DIG. 7, 73 F; 264/258, 137, 136, 135; 181/33 G, 33 GA; 428/225, 228, 247, 251, 253, 257, 268, 273, 288, 255, 289, 245, 116

[56] References Cited

U.S. PATENT DOCUMENTS

| | | | |
|---|---|---|---|
| 2,847,395 | 8/1958 | Wear | 428/251 |
| 3,093,160 | 6/1963 | Boggs | 264/258 |
| 3,252,850 | 5/1966 | Portawsky et al. | 428/268 |
| 3,446,661 | 5/1969 | Anderson | 428/268 |
| 3,481,823 | 12/1969 | Salyer | 428/268 |
| 3,674,585 | 7/1972 | Windecker | 156/245 |
| 3,691,000 | 9/1972 | Kalnin | 273/DIG. 7 |
| 3,772,126 | 11/1973 | Myers | 264/137 |
| 3,794,555 | 2/1974 | Sanjana | 428/273 |
| 3,814,275 | 6/1974 | Lemons | 220/453 |
| 3,867,221 | 2/1975 | Charot | 156/245 |
| 3,873,654 | 3/1975 | Smith | 156/245 |
| 3,915,783 | 10/1975 | Goppel et al. | 156/245 |

*Primary Examiner*—Caleb Weston
*Attorney, Agent, or Firm*—Patrick J. Schlesinger; Frank D. Gilliam

[57] ABSTRACT

An acoustical laminate comprising multi-ply glass fabric impregnated with an epoxy resin and a method of manufacturing the laminate. The laminate may be bonded to suitable backing, such as a honeycomb core with a solid backing, to produce an acoustical panel. The panel provides excellent, substantially linear, sound absorption characteristics.

5 Claims, No Drawings

METHOD OF MAKING ACOUSTICAL LAMINATE

This is a division of application Ser. No. 672,353 filed Mar. 31, 1976, now U.S. Pat. No. 4,091,160.

BACKGROUND OF THE INVENTION

This invention relates to acoustic laminates and panels and more specifically, to laminates comprising epoxy resin impregnated glass fabrics.

A variety of acoustic sandwich constructions are known in the art. These generally consist of an impervious backing sheet and a porous face sheet separated by a foam or compartmented layer, such as a honeycomb core. Typical of these acoustic panels is that disclosed by B. T. Hulse et al, in U.S. Pat. No. 3,166,149 and T. S. Crispin et al, in U.S. Pat. No. 3,822,762. Often these panels include a porous cover sheet which, while sometimes decorative, adds undesirable weight to the assembly while reducing the acoustic efficiency of the system.

While some of the prior art acoustic laminates and panels have been relatively effective, problems remain both in the structures and methods of manufacture. Resin characteristics, such as quantity of resin, flow and wetting characteristics, etc., affect panel properties. In some cases resin may block pores, reducing acoustic properties, while in others which limit resin flow to a point where porosity is retained, structural characteristics of the acoustic laminate are poor, resulting in delamination or unbonded conditions when the panel is subjected to loading.

Polyimide resin impregnated glass fabric acoustic laminates of the sort described in U.S. Pat. No. 3,502,171, have been used, especially in high temperature applications. However, these materials have a number of disadvantages when their high temperature characteristics are not required. Because of the high temperature cures required and the release of volatiles during cure, these materials cannot conveniently be cured on plaster or other similar tooling. Both the raw material cost and the cost of fabrication (due to the required high temperature cure and postcure, and the necessarily elaborate bleeder system) for polyamide materials are undesirably high.

Attempts have been made to use polyester and epoxy resins, which do not release significant volatiles upon curing and have inherently greater flow than polyimides. However, problems have been encountered in controlling acoustic and/or structural properties as a consequence of the basic resin characteristics. Thus, these resins have not come into practical use.

Therefore, there is a continuing need for improvements in acoustic laminates and panels.

OBJECTS OF THE INVENTION

It is, therefore, an object of this invention to provide an acoustic laminate and method of manufacture thereof overcoming the above-noted problems.

Another object of this invention is to provide an acoustic laminate and panel having superior acoustic properties.

A further object of this invention is to provide an acoustic laminate and panel combining high strength with light weight.

A still further object of this invention is to provide an easily reproducible method for producing high strength, lightweight, acoustically effective acoustic laminates and panels.

SUMMARY OF THE INVENTION

The above objects, and others, are accomplished in accordance with this invention by a laminate made by impregnating a plurality of glass fabric sheets with a suitable epoxy resin, curing the resin to the "B-stage", laying up the plurality of sheets to form a stack having selected sheet orientation, and curing the resin to the "C-stage" under suitable temperatures and pressure conditions. An acoustic panel may then be made by bonding this laminate to a suitable core and backing assembly. Typically, a honeycomb core with an impervious backing is coated along the core outer edges with a suitable adhesive, the laminate is pressed thereagainst and the adhesive is cured.

DETAILED DESCRIPTION OF THE INVENTION

The acoustic laminate and panel of this invention may have any suitable configuration and physical characteristics. They may, for example, be flat or curved in one or more planes. In one embodiment, when used in aircraft engine cowling, the laminate and panel may be shaped to correspond to an inlet cowl or nose dome shape. The primary factors in selecting fabric type, thickness, number of plies, etc., and epoxy resin type and quantity are airflow resistance, mechanical strength and sound absorption properties, such as resonant frequency.

The resonant frequency of a resonator may be expressed by the equation:

$$V_o = \frac{c}{2\pi} \sqrt{\frac{ns}{Vl_e}} = \frac{c}{2\pi} \sqrt{\frac{\sigma}{bl_e}}$$

for a honeycomb sandwich where "Vo" is the resonant frequency, le is equal to $1 + 0.8s^{\frac{1}{2}}$, "s" is the cross-sectional area of the hole, "l" is the length of the hole (i.e., sheet thickness for perforated metal), "n" is the number of holes, "V" is the volume of the cell, "c" is the velocity of sound, "b" is the core thickness and "Σ" is the fractional open area. This establishes a relationship between the length of the hole, which is affected by the thickness of the perforated facing, and the frequency of the sound to be absorbed. Consequently, the particular application may affect the desired facing thickness, depending upon whether the other variables are changed or held constant. Similarly, the percent open area or porosity of the facing, or the core thickness for a honeycomb sandwich may be selected to achieve the desired sound absorption characteristics.

The laminate may be prepared in a manner providing any suitable airflow resistance (measured in rayls) depending upon the selected acoustic application. A "rayl" is the ratio of the pressure drop in dynes/cm² across a porous medium, to the gas flow velocity in cm/sec. across the medium. Thus, a rayl rating is indicative of porosity or percent open area of the medium. For most aircraft engine cowling applications, excellent results are generally obtained with an airflow resistance value in the range of about 2 to 60 rayls at an airflow velocity of about 17 cm/sec. with optimum results dependent upon the characteristics of the particular engine. The airflow resistance of these laminates will, of course, be proportionally lower and higher at lower and higher air flow rates, respectively.

The laminate may have any suitable thickness. Best results are generally obtained where the laminate has a thickness in the range of 0.02 to 0.10 inch. Thicker laminates tend to have greater mechanical strength, but become undesirably heavy, more difficult and complex to fabricate, and expensive, while much thinner laminates have insufficient strength. Optimum results for aircraft engine cowling applications have been obtained with laminates in the about 0.025 to 0.080 inch range.

The laminate includes one or more plies of a suitable glass fabric. While a single ply has advantages in simplicity of lay up and pattern uniformity, multiple plies are generally preferred because of ease in forming high quality splices between adjoining fabric sheets in large panels and because a greater range of desired thickness and strength can more easily be obtained. Open, plain weave glass fabrics are preferred so that a sufficient quantity of resin may be used to provide high strength without unduly increasing air flow resistance. A leno weave in which a thread locks the strands in position is preferred for homogeneity of porosity across the surface. Where a low rayls number is desired, a single ply of open weave material could be selected, while for higher rayls numbers, multi-ply tighter weave material or three-dimensional woven multilayer fabrics would be selected. Multiple plies are preferable given a pseudo-isotropic orientation, e.g., for 3 plies; preferred orientation would be 0°, 30°, 60°.

The selected glass fabric may be impregnated with any suitable epoxy resin. Typical epoxy resin include Bisphenol-A resins, novolac epoxy resins, cycloaliphatic epoxies, polyolefin epoxies, etc. Any suitable curing agent, such as suitable aromatic amines, amides or acid anhydrides, with or without a catalyst may be used. The curing agent is ordinarily used in a stoichiometric equivalent ratio. The resins should be capable of being B-staged to a controlled flow range and/or contain flow control agents such as pyrogenic or fumed colloidal silica, colloidal asbestos or an elastomer such as acrylonitrile-butadiene in an amount up to about 15 weight percent, based on resin weight.

The quantity of resin, curing agent and any additive used is dependent upon the glass fabric with which it is employed, since some types of strands pick up more resin than others. Also, the type of weave affects the percentage resin content. Further, the resin flow characteristics determine the limiting range of resin quantity which may be used to produce a selected airflow resistance. In practice, when a specific combination of glass fabrics and resin is selected, test samples with differing resin quantities will be prepared and tested for airflow resistance to emperically determine the optimum resin quantity and characteristics (such as the desirability of additives), and the optimum degree of advancement or B-staging.

When excessive resin is used, porosity and control of the acoustic characteristics of the laminate are reduced, while insufficient resin results in a weak structure subject to delamination in use. In general, depending upon the type fabric, from about 13 to 32 weight percent resin in the dry impregnated laminate, based on glass fabric weight, gives the preferred combination of acoustic property control and structural strength, with optimum results occurring in the 17 to 32 percent range.

The laminate may be formed and used in any suitable manner. Preferably, individual plies of the selected fabrics are impregnated with the selected resin, which is then cured to the B-stage to form a "pre-preg." With some resins, flash-drying for 5 to 15 minutes at a temperature of about 200 to 300° F. gives optimum curing to the B-stage.

The individual plies are then laid up on a mold surface in a selected orientation and the resin is fully cured. Any suitable mold surface may be used. Typical molds include plaster or aluminum surfaces, generally coated with a release agent such as a paste wax or fluorocarbon film. During cure the lay-up is preferably covered with a suitable bleeder sheet and subjected to vacuum or positive pressure during heating to cure the resin. In some cases, each ply of fabric may be impregnated with an epoxy resin which has had its flow characteristics adjusted with additives, the plies may be laid up on the mold surface and the resin directly fully cured. With most resins, optimum full cure is obtained by heating to from 200° to 300° C. for about 60 to 120 minutes at a pressure up to about 50 psi.

The acoustic laminate of this invention may be bonded to any suitable core and backing combination to produce an acoustic panel. Preferably, the core is a honeycomb such as metal or reinforced plastic cores having a thickness of from approximately 0.20 to 2.0 inches, available from Hexcel or American Cyanamid Co., with an impervious backing. The facing laminate may be bonded, such as by an adhesive, to the core in any suitable manner. The bonding should be uniform across the core to provide maximum strength, although the adhesive must be kept off of the laminate in core open areas, since otherwise airflow and acoustic properties will be adversely affected. Preferably, the outer edges of the core are coated with adhesive, the laminate is pressed thereagainst and the adhesive is cured. The impervious backing may be bonded to the core prior to, contemporaneous with, or after bonding of the acoustic laminate to the core.

The basic steps in a preferred embodiment of the process of this invention include impregnating an open leno weave glass fabric with a suitable epoxy resin, curing the resin to the B-stage, laying up two or more sheets of the fabric on a suitable mold, placing a bleeder pack over the fabric, curing the resin to the C-stage, and bonding the resulting laminate to a honeycomb core having an impervious backing to produce an acoustical structure. The final product, consisting of an acoustic laminate spaced from an impervious sheet by an open (such as a honeycomb) core, has excellent structural and acoustic properties.

DESCRIPTION OF PREFERRED EMBODIMENTS

Further details of this invention are described in the following Examples which constitute preferred embodiments of the process and products of this invention. Parts and percentages are by weight, unless otherwise indicated.

EXAMPLE I

Equal amounts of two Bisphenol-A type epoxy resins, Shell Chemical's Epon 828 and Epon 1001, are blended with an eutectic composition of two aromatic diamines, p, p'-methylene diamine and m-phenylene diamine, available from Shell Chemical Company under the Curing Agent Z designation, in a methyl ethyl ketone solvent. Three sheets of Type 7533 glass fabric from Clark Schwebel, Inc., (ECG 75, ½ plain weave, 18×18 construction) are impregnated with this mixture, then flash dried by heating for about 15 minutes at about 200° F.

Resin pickup, dry, is about 32 percent. The sheets are laid up with the warp of each successive sheet oriented at 0°, 30°, and 60° to one another against a tool surface coated with a polyvinyl alcohol and wax treated surface. This layup is covered with a perforated fluorocarbon release film, available from E. I. duPont de Nemours under the Teflon trademark, and three plies of a 181 glass fabric bleeder, then the resin is cured under about 10 inches of mercury vacuum for about 2 hours at about 200° F. The cured laminate when tested for airflow resistance at an airflow velocity of about 16.95 cm/sec. gives a value of about 30 rayls (cgs). A core and backing member is prepared having the same configuration as the acoustic laminate. The core consists of 2.1 pcf aluminum flexcore honeycomb from Hexcel bonded to an impervious backing of F 155-5-F69/1581 epoxy prepreg. The edges of the open honeycomb cells are coated with a reticulating epoxy adhesive from American Cyanamid Co. The laminate is pressed thereagainst by a vacuum bag at a pressure of about 24 inches of mercury and temperature of about 250° F. for about 90 minutes to cure the adhesive and prepreg. A strong, well bonded acoustic panel results, having excellent acoustic properties.

EXAMPLE II

An epoxy resin, a modified Bisphenol-A/novolac epoxy resin blend mixed with a dicyandiamide curing agent is available under the 5134 designation from E. I. duPont de Nemours & Co. to provide an about 250° F. curing system. Three sheets of Type 7533 glass fabric are impregnated with the resin blend and dried, producing a B-stage prepreg having a resin content of about 27.6 percent, a volatile content of about 0.8 percent and zero flow when measured at 250° F. under 15 psi. The three plies are oriented with the warp at about 0°, 30° and 60°, respectively. against a polyvinyl alcohol/wax release treated plaster tool surface. The lay-up is covered with a layer of perforated Teflon fluorocarbon release film and three plies of 181 glass fabric bleeder, and cured under full vacuum (at least about 25 inches of mercury) for about 1 hour at about 250° F. The cured acoustic laminate is tested for airflow resistance using an airflow velocity of about 16.95 cm/sec., giving a value of about 26.2 rayls (cgs). The acoustic laminate has excellent acoustic properties when bonded to a honeycomb core with an impervious backing.

EXAMPLE III

A catalyzed resin solution is prepared as described in Example II. Three sheets of Type 7533 glass fabric are impregnated with the resin and dried, producing a B-stage prepreg having a resin content of about 26.3 percent. The three plies are stacked on an aluminum tooling surface coated with Frekote 33 release agent.

The warp of each ply is oriented to produce a 0°, 30°, 60° arrangement. The stack is covered with a sheet of perforated Teflon fluorocarbon film and three plies of 181 glass fabric bleeder. The resin is fully cured under full vacuum, greater than 25 inches of mercury, at about 250° F. for about one hour. An airflow resistance of about 26.5 rayls (cgs) is obtained when tested at an airflow velocity of about 16.95 cm/sec.

EXAMPLE IV

Twelve sheets of type 7533 glass fabric are impregnated with an epoxy resin and cured to the B-stage as described in Example II. Resin content of the dried prepreg is about 27.8 percent. A first set of four of the sheets is oriented with the warp at 0°, 30°, 60° and 90° against a polyvinyl alcohol/wax released tool surface. Another set is stacked on a similar surface with warp orientation of 0°, 22°, 44° and 66°. A third set is stacked on a Frekote 33 released aluminum surface with warp orientations of 0°, 22°, 44° and 66°. Each stack is fully cured as described in Example II. The first set gives an airflow resistance of about 25.0 rayls, the second about 29.8 rayls and the third about 26.6 rayls, all at an airflow velocity of about 16.95 cm/sec.

EXAMPLE V

A sheet of a three dimensional woven 3-layer glass fabric, having an 11 by 11 count construction available from Woven Structures, Inc., is impregnated with a blend consisting of equal amounts of two Bisphenol-A epoxy resins, available from the Shell Chemical Co., under the Epon 828 and Epon 1001 designations and a stoichiometric equivalent amount of an eutectic composition of two aromatic diamines, p,p'-methylene dianiline and m-phenylene diamine, available from the Shell Chemical Co., under the Curing Agent Z designation, in a methyl ethyl ketone solvent. The prepreg is flash dried by heating for about 10 minutes at about 200° F. Resin pickup, dry, is about 21.8 percent. The prepreg is fully cured against a polyvinyl alcohol/wax release treated tool surface under about 1 psi pressure for about two hours at about 200° F. The cured acoustic laminate is found to have an airflow resistance of about 16.9 rayls at an airflow velocity of about 16.95 cm/sec. The laminate is then bonded to a one inch thick, 2.2 pcf reinforced phenolic hexagonal homeycomb core, by coating the core edge with a paste epoxy adhesive from the 3M Co., then passing the laminate thereagainst for about 90 minutes at about 240° F. and about 12 psi. An impervious sheet of epoxy laminate is bonded to the back surface of the core. The resulting panel is found to have excellent acoustic properties and high structural strength.

EXAMPLE VI

A sheet of Type ES-1189 glass fabric (21 percent open area), available from Woven Structures, is impregnated with a blend consisting of two Bisphenol-A epoxy resins, available from Shell Chemical Company under the Epon 828 and Epon 1001 trade marks in a ratio of 75 to 25 parts by weight, and a stoichiometric equivalent amount of eutectic composition of two aromatic diamines, p,p'-methylene dianiline and m-phenylene diamine, available from Shell Chemical Company under the Curing Agent Z designation, in a methyl ethyl ketone solvent. The prepreg is flash dried by heating for about seven minutes at about 200° F. Resin content of the prepreg is about 17 percent. The prepreg is fully cured between two sheets of fluorocarbon release film (available from duPont under the Teflon trademark) placed between metal caul plates by heating for about 2 hours at about 200° F. under about 30 psi pressure. The cured acoustic laminate is found to have an airflow resistance of about 2.8 rayls at an airfllow velocity of about 16.95 cm/sec. The laminate is then bonded to 0.663 inch thick ⅜-inch-5056 aluminum —0.003 inch Dura-Core, available from Hexcel, with an unsupported film adhesive from American Cyanamid Company which is perforated and reticulated in position on the core. The laminate is pressed thereagainst and an aluminum sheet is simultaneously bonded to the back surface of the core with a supported film adhesive by heating at about 350° F. under about 40 psi pressure for about 60 minutes. The resulting sandwich panel is found to have excellent acoustic properties and high structural strength.

EXAMPLE VII

A sheet of ES-1189 glass fabric, available from Woven Structures, is impregnated with a blend consisting of equal amounts of solid Bisphenol-A epoxy resin and a tetrafunctional tetraphenylmethane type epoxy, available from Shell Chemical and Ciba-Geigy under the Epon 1001 and ERRA 0163 trademarks, respectively, and a stoichiometric equivalent ratio of HET-anhydride (hexachloro endomethylene tetrahydrophthalic anhydride), available from Hooker Electrochemical Company, in a methyl ethyl ketone solvent. The prepreg is dried by heating for about 10 minutes at about 285° F. Resin content of the prepreg is about 20 percent. The prepreg is cured for about 1 hour at about 285° F. under about 50 psi pressure between fluorocarbon coated glass fabric bleeder plies available from Taconic Coated Fabrics under the Armalon designation plus one ply of 181 glass fabric bleeder. The laminate is postcured for about 2 hours at about 400° F. A high temperature resistant laminate results with good acoustic properties and a high strength-to-weight ratio.

EXAMPLE VIII

Type 1532 glass fabric (ECG 150, ⅝ plain weave, 16 × 14 count) available from J. P. Stevens Co., is impregnated with a blend consisting of a liquid cycloaliphatic epoxy resin and a solid Bisphenol-A epoxy resin, available from Ciba-Geigy under the Araldite CY 178 and Araldite 6060 trademarks, respectively, in a ratio of 75 to 25 parts by weight, and a 0.9 stoichiometric equivalent ratio of hexahydrophthalic anhydride, available from National Aniline Division, Allied Chemical Corporation, plus 12 parts per hundred resin of an organo-metallic catalyst (sodium alcoholate), available from Ciba-Geigy under the designation of Accelerater 065, in a methyl ethyl ketone solvent. It is then heated at about 200° F. until a volatile content less than 1.0 percent and less than 1% flow at about 250° F. under about 5 psi is obtained. Resin content is about 26 percent. Four sheets are laid up with the warp of each successive sheet oriented at 0°, 15°, 30°, 45° to one another against a tool surface coated with Frekote 33 release agent from Frekote, Inc. The layup is covered with a layer of perforated Teflon fluorocarbon release film and three plies of 181 glass fabric bleeder, and cured under about 10 inches of mercury vacuum for about 2 hours at about 250° F. plus about 2 hours at about 300° F. The laminate has good acoustic characteristics when bonded to a honeycomb core with an impervious backing.

Although specific conditions and ingredients have been described in the above examples of preferred embodiments, these may be varied and other additives, such as the flow control agents discussed above may be used, where suitable. Other modifications and variations of this invention will occur to those skilled in the art upon reading this disclosure. These are intended to be included in this invention, as defined by the appended claims.

I claim:

1. The method of fabricating an acoustic panel which comprises the steps of:
    providing at least two sheets of prepreg material comprising an open weave glass fiber fabric impregnated with about 13 to 32 weight percent epoxy resin advanced to the B-stage, based on glass fabric weight;
    placing said at least two sheets on a mold surface having a selected configuration;
    placing a bleeder pack over said at least two sheets;
    completing cure of said resin at a temperature of from about 150 to 300° F. at a pressure of from about 5 to 100 psi, whereby an acoustic laminate having an airflow resistance of about 2 to 60 rayls at an airflow velocity of about 17 cm/sec. results; and
    bonding said acoustic laminate to the face of a honeycomb core sheet having an impervious backing to produce an acoustic panel.

2. The method according to claim 1 where said laminate is formed to a cured thickness of about 0.02–0.10 inch.

3. The method according to claim 1 wherein at least two sheets of a leno weave glass fabric prepreg are placed on said mold surface and said laminate is formed to a cured thickness of from about 0.025 to 0.080 inch.

4. The method according to claim 1 wherein at least two sheets of an open weave glass fabric prepreg are placed on said mold surface and said laminate is formed to a cured thickness of from about 0.025 to 0.080 inch.

5. The method according to claim 1 where said epoxy resin comprises a Bisphenol-A type epoxy resin.

* * * * *